United States Patent
Lee et al.

(10) Patent No.: US 9,341,407 B2
(45) Date of Patent: May 17, 2016

(54) APPARATUS FOR STORING ICE AND METHOD FOR CONTROLLING SAME

(75) Inventors: Taehee Lee, Seoul (KR); Youngjin Kim, Seoul (KR); Junsung Lee, Seoul (KR); Kyunghan Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

(21) Appl. No.: 13/807,864

(22) PCT Filed: Jun. 30, 2011

(86) PCT No.: PCT/KR2011/004822
§ 371 (c)(1),
(2), (4) Date: Mar. 18, 2013

(87) PCT Pub. No.: WO2012/002761
PCT Pub. Date: Jan. 5, 2012

(65) Prior Publication Data
US 2013/0167563 A1    Jul. 4, 2013

(30) Foreign Application Priority Data
Jul. 2, 2010    (KR) .................. 10-2010-0063986

(51) Int. Cl.
| F25C 5/18 | (2006.01) |
| F25D 29/00 | (2006.01) |
| F25C 1/04 | (2006.01) |
| F25C 5/00 | (2006.01) |
| F25C 1/12 | (2006.01) |

(Continued)

(52) U.S. Cl.
CPC . *F25D 29/00* (2013.01); *F25C 1/04* (2013.01); *F25C 1/12* (2013.01); *F25C 5/002* (2013.01); *F25C 5/182* (2013.01); *F25D 21/14* (2013.01); *F25D 23/02* (2013.01); *F25C 2305/022* (2013.01); *Y02P 60/855* (2015.11)

(58) Field of Classification Search
CPC ............... F25C 5/04; F25C 1/12; F25C 1/04; F25C 5/02; F25C 5/182; F25C 2305/22; F25D 23/02; Y02P 60/855
USPC ..................................... 62/320, 344
See application file for complete search history.

(56) References Cited

U.S. PATENT DOCUMENTS

| 4,733,539 A | 3/1988 | Josten et al. |
| 5,259,201 A | 11/1993 | Sakai et al. |

(Continued)

FOREIGN PATENT DOCUMENTS

| CN | 201155897 | * 11/2008 | ............... F25C 1/12 |
| CN | 201155897 Y | 11/2008 | |

(Continued)

*Primary Examiner* — Emmanuel Duke
(74) *Attorney, Agent, or Firm* — Dentons US LLP (57) ABSTRACT

An apparatus for storing ice that includes a housing with heat insulation characteristics and a storage space; an ice maker in the housing, which includes an ice tray; an ice bin arranged below the ice maker; a transfer member arranged within the ice bin to discharge ice to the outside of the ice bin; a refrigerating cycle that extends into the housing, and which includes an evaporation unit attached to the outer surface of the ice tray; and a control unit which controls the operation of the refrigerating cycle and of the transfer member. Air in the storage space is cooled by being in contact with the evaporation unit and/or the ice tray, and the control unit operates the refrigerating cycle to cool the storage space when the temperature of the ice tray and/or of the evaporation unit is higher than a preset temperature.

6 Claims, 7 Drawing Sheets

(51) Int. Cl.
*F25D 21/14* (2006.01)
*F25D 23/02* (2006.01)

(56) References Cited

U.S. PATENT DOCUMENTS

| | | | |
|---|---|---|---|
| 5,778,686 A * | 7/1998 | Choi | 62/71 |
| 6,955,056 B1 * | 10/2005 | An et al. | 62/74 |
| 7,201,007 B2 * | 4/2007 | Shoukyuu et al. | 62/137 |
| 7,555,909 B2 * | 7/2009 | Chang | 62/66 |
| 2003/0097855 A1 * | 5/2003 | Rovira-Adame | 62/279 |
| 2005/0126202 A1 * | 6/2005 | Shoukyuu et al. | 62/351 |
| 2005/0235665 A1 * | 10/2005 | Kim et al. | 62/135 |
| 2006/0266056 A1 * | 11/2006 | Chang | 62/135 |
| 2008/0157644 A1 * | 7/2008 | Lee et al. | 312/405 |
| 2009/0187280 A1 * | 7/2009 | Hsu et al. | 700/275 |
| 2009/0223230 A1 * | 9/2009 | Kim et al. | 62/73 |

FOREIGN PATENT DOCUMENTS

| | | | |
|---|---|---|---|
| CN | 101476804 A | 7/2009 | |
| CN | 101650105 A | 2/2010 | |
| CN | 201517875 U | 6/2010 | |
| JP | 2004309104 | * 11/2004 | F25C 1/00 |
| KR | 2019980058872 U | 10/1998 | |
| KR | 10-2004-0085596 A | 10/2004 | |
| KR | 10-2005-0104129 A | 11/2005 | |
| KR | 1020060124338 A | 12/2006 | |
| KR | 10-2007-0120765 A | 12/2007 | |

* cited by examiner

APPARATUS FOR STORING ICE AND METHOD FOR CONTROLLING SAME

This application is a 35 USC §371 National Stage entry of International Application No. PCT/KR2011/004822 filed on Jun. 30, 2011, and claims priority of Korean Application No. 10-2010-0063986 filed on Jul. 2, 2010, all of which are incorporated by reference in their entirety herein.

TECHNICAL FIELD

The present disclosure relates to an apparatus for storing an ice and a method for controlling the same.

BACKGROUND ART

In general, in case of wafer purifiers which are capable of dispensing an ice or commercial ice making apparatus, a direction cooling type ice making system and an ice storage system are adopted.

In case of the direct cooling type ice making system and the ice storage system, an ice may be made by using a refrigerant tube extending along an outer surface of an ice tray. Furthermore, an ice storage space in which the ice tray is received may be cooled through the heat-exchange between the refrigerant tube and the ice tray. Thus, even though an ice making process is not performed, a refrigerating cycle operation should be performed to circulate a refrigerant along the refrigerant tube extending along the outer surface of the ice tray.

In this case, moisture within the storage space may be frozen on the refrigerant tube and the outer surface of the ice tray. As a result, the refrigerant and cool air within the storage space are not smoothly heat-exchanged with each other. Thus, the heat-exchange performance between the ice tray and the refrigerant tube may be gradually reduced. Therefore, it may be impossible to control a temperature of the storage space.

In addition, ice making performance may be reduced due to the reduction of the heat-exchange performance between the refrigerant tube and the ice tray.

DISCLOSURE OF THE INVENTION

Technical Problem

Embodiments provide an ice storage apparatus in which an operation time of a refrigerating cycle for cooling an ice making space is controlled to prevent an ice tray and a refrigerant tube from being frozen in a refrigerating system for cooling a storage space by using the refrigerating pipe mounted on the ice tray and a method for controlling the same.

Embodiments also provide an ice tray structure for sufficiently heat-exchanging cool air transferred from a refrigerant tube with air within a storage space and a structure which is capable of treating defrosted water dropping down from an outer surface of the ice tray.

Technical Solution

In one embodiment, an ice storage apparatus includes: a housing having a heat insulation characteristic, the housing having a storage space therein; an ice maker received within the housing, the ice maker including an ice tray for making ices; an ice bin disposed under the ice maker to store the ices made in the ice maker; a transfer member disposed within the ice bin to discharge the ices to the outside of the ice bin; a refrigerating cycle extends into the housing, the refrigerating cycle, the refrigerating cycle including an evaporation unit attached to an outer surface of the ice tray to cool the ice tray; and a control unit for controlling operations of the refrigerating cycle and the transfer member, wherein air within the storage space is directly cooled by contacting the evaporation unit and/or the ice tray, and the control unit operates the refrigerating cycle to cool the storage space when the ice tray and/or the evaporation unit have/has a temperature greater than a set temperature (Ta).

In another embodiment, a method for controlling an ice storage apparatus including a housing defining a storage space, an ice tray received within the housing, and an evaporation unit attached to an outer surface of the ice tray, wherein the ice tray and the evaporation unit directly contact air within the housing to cool the storage space includes: cooling the ice tray after a surface temperature of the ice tray and/or the evaporation unit reach a set temperature (Ta) even though the temperature of the storage space is increased to a temperature greater than the set temperature (Ta) at which the cooling is required.

Advantageous Effects

The ice storage apparatus including the above-described components and the method for controlling the same according to the embodiments may have following effects.

First, the ice storage apparatus using the direct type cooling method in which the evaporation unit and/or the ice tray are/is directly heat-exchanged with the air within the refrigerator, even though the air within the refrigerator is greater than the set temperature, the refrigerating cycle may be operated after the evaporation and/or the ice tray has/have surface temperature(s) greater than the set temperature to completely remove the ices attached to the ice tray and the evaporation unit.

Second, since the ices attached to the ice tray and the evaporation unit are completely removed after the inside of the refrigerator is cooled, the heat exchange efficiency between the ice tray and/or evaporation unit and the air within the storage space may be improved.

Third, the ice tray may be expanded in area to reduce a time taken for cooling the air within the storage space, thereby reducing the power consumption.

Third, since the defrosted water tray for receiving the defrosted water generated when the ices attached to the ice tray and the evaporation unit are melted is separately provided, the humidity within the storage space may be maintained at a low level.

Fourth, since the humidity within the storage space is maintained at the low level, the phenomenon in which the surfaces of the ice tray and the evaporation unit are frozen may be reduced.

MODE FOR CARRYING OUT THE INVENTION

Hereinafter, an ice storage apparatus and a method for controlling the same according to embodiments will be described in detail with reference to the accompanying drawings. A water purifier having ice generation and storage functions will be described as an example. However, the present disclosure is not limited to the water purifier having the ice making function. For example, various apparatuses which make and store ices and include a storage space for storing the made ices such as refrigerators or freezers may be applied to the current embodiments.

Figure 1:
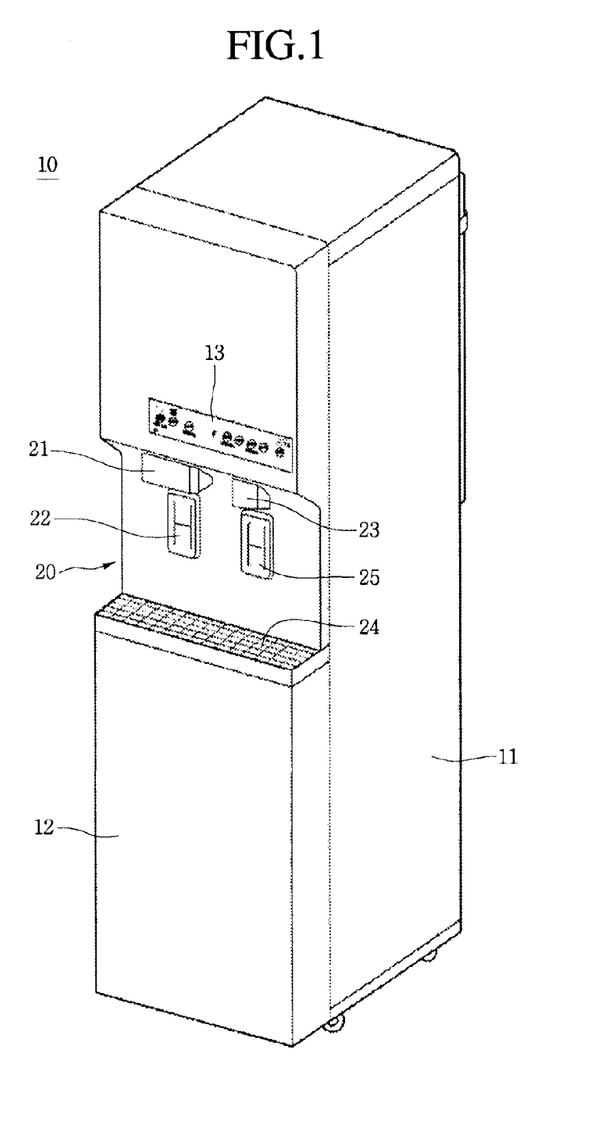
FIG. 1 is a perspective view illustrating an outer appearance of a water purifier according to an embodiment.

FIG. 1 is a perspective view illustrating an outer appearance of a water purifier according to an embodiment.

Referring to FIG. 1, a water purifier 10 according to an embodiment includes a cabinet 11 and a front cover 12 coupled to an opened front surface of the cabinet 11. Here, an outer appearance of a main body of the water purifier 10 may be defined by the cabinet 11 and the front cover 12. Also, units for supplying purified water, cool water, hot water, and ices may be disposed within the main body defined by the cabinet 11 and the front cover 12. For example, a refrigerating cycle for making ices, a heating unit for generating hot water, a filter member for purifying water, an ice compartment for making and storing ices, a water tank for storing water, and a pump for pumping the water stored in the water tank may be received within the main body. Also, the refrigerating cycle includes a compressor, a condenser, an expansion member, and an evaporator.

A control panel 13 including a button part for inputting various functions and an operation command and a display part for displaying an operation state of the water purifier 10 is disposed on one side of a front surface of the front cover 12. Also, a dispenser 20 for dispensing water or ices is disposed in the front surface of the front cover 12.

In detail, the dispenser 20 includes a receiving part for receiving a container in which water or an ice is received. The receiving part is recessed backward from the front surface of the front cover 12 by a predetermined depth. Also, the dispenser 20 includes an ice chute 21 extending from a top surface of the recessed portion to guide discharge of the ices and a water chute 23 extending to guide dispensing of water. The dispenser 20 further includes an ice button 22 and a water button 25 which are disposed on a rear surface of the recessed portion to input an ice dispensing command and a water dispensing command, respectively. Also, the dispenser 20 further includes a residual water drain 24 disposed in the bottom of the recessed portion to receive residual water.

Various parts for making, storing, and dispensing ices are received within the main body of the water purifier 10. The parts are disposed in an upper portion of the main body of the water purifier 10. Hereinafter, the units for making, storing, and supplying ices in the water purifier 10 will be described with reference to the accompanying drawings.

Figure 2:
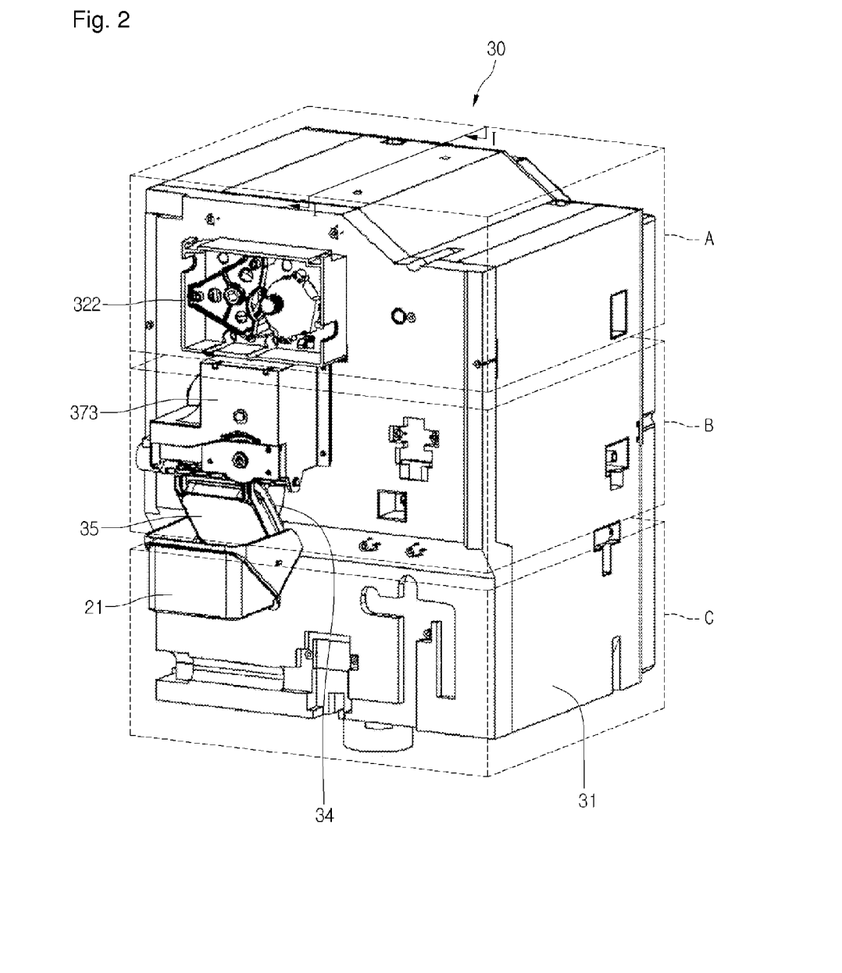
FIG. 2 is a perspective view illustrating an outer appearance of an ice making assembly disposed within the water purifier according to an embodiment.
Figure 3:
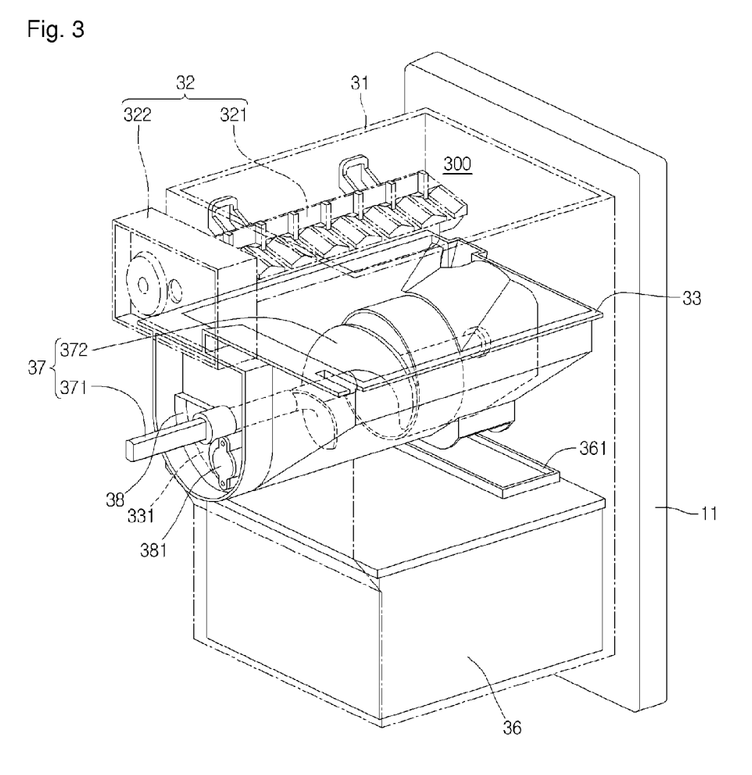
FIG. 3 is a perspective view illustrating an inner structure of the ice making assembly in a state where a housing defining an outer appearance of the ice making assembly is removed.
Figure 4:
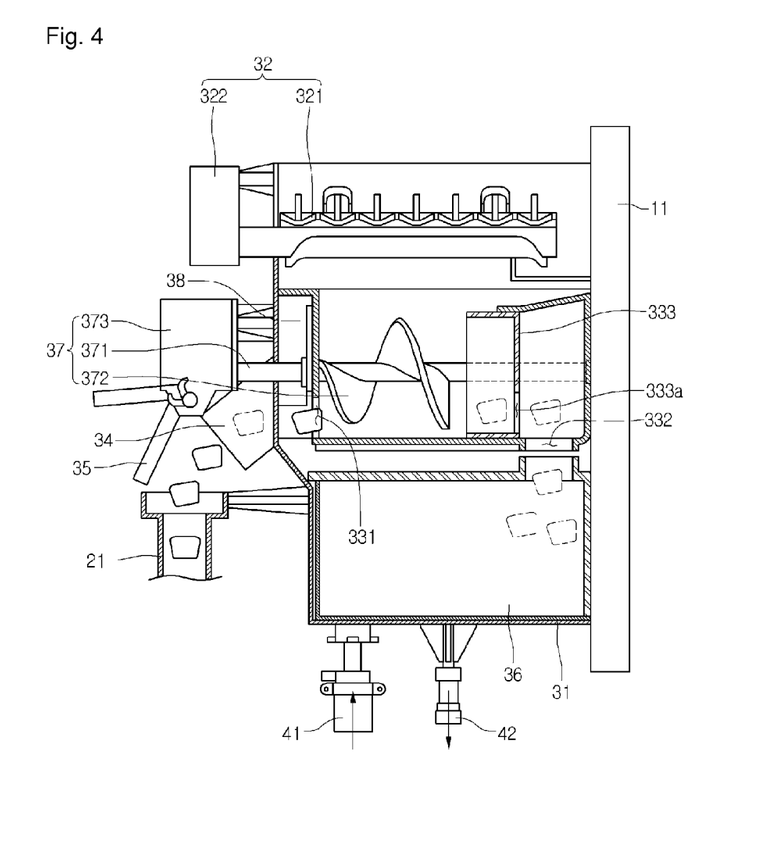
FIG. 4 is a longitudinal sectional view taken along line I-I of FIG. 2.

FIG. 2 is a perspective view illustrating an outer appearance of an ice making assembly disposed within the water purifier according to an embodiment. FIG. 3 is a perspective view illustrating an inner structure of the ice making assembly in a state where a housing defining an outer appearance of the ice making assembly is removed. FIG. 4 is a longitudinal sectional view taken along line I-I of FIG. 2.

Referring to FIG. 2, an ice making assembly 30 according to an embodiment may include an ice making part A for making ices, an ice storage part B for storing the ices made in the ice making part A, and a water storage part C for storing cool water.

In detail, an outer appearance of the ice making assembly 30 may be defined by a housing 31. Also, the ice making assembly 30 may have an approximately hexahedral shape. Also, parts for making ices, storing the made ices, and storing water are disposed within the housing 31. A heat insulation layer may be provided within the housing 31 to improve a heat insulation characteristic. As shown in FIG. 2, an ice separation motor assembly 322, a transfer motor assembly 373, and a damper 35 may protrude outward from the housing 31. The ice separation motor assembly 322 is configured to separate made ices from an ice making container, and the transfer motor assembly 373 is configured to transfer the ices stored in the ice storage part B to the outside. Also, the ices stored in the ice storage part B may be selectively dispensed to the outside through the ice chute 21 by selectively opening or closing the damper 35.

Referring to FIGS. 3 and 4, the ice making part A includes an ice maker 32 for making ices. Also, the ice storage part B includes an ice bin 33 for storing the ices made in the ice maker 32 and a transfer member 37 for transferring the ices stored in the ice bin 33 to the outside. Also, the water storage part C includes a cool water tank 36 in which the ices stored in the ice bin 33 are putted to store cool water having a low temperature. When a user pushes the cool water button, the water stored in the cool water tank 36 may be dispensed.

In detail, the ice maker 32 includes an ice tray 321 partitioned into a plurality of spaces, each having a size corresponding to that of an ice to be made to store water for making ices, an ice separation unit for drawing up the ices stored in the ice tray 321 to drop into the ice bin 33, and the ice separation motor assembly 322 for driving the ice separation unit. The ice separation unit includes an ice separation shaft (see reference numeral 324 of FIG. 6) rotated by the ice separation motor assembly 322 and an ejector (see reference numeral 325 of FIG. 6) protruding from an outer surface of the ice separation shaft 324 to draw up the ices made in the partitioned spaces of the ice tray 321.

Also, the transfer member 37 includes a transfer shaft 371, the transfer motor assembly 373 for rotating the transfer shaft 371, an auger 372 wound spirally or helically around an outer surface of the transfer shaft 371 to push ices; and an opening/closing wall 333 integrally coupled to the transfer shaft 371 at a position corresponding to an end of the auger 372.

The ice bin 33 has an opened top surface. Thus, ices made in the ice tray 321 may drop into the ice bin 33 through the opened top surface of the ice bin 33. Also, a first discharge hole 331 for dispensing ices is defined in one surface of the ice bin 33. Also, a discharge duct 34 for guiding the discharge of ices is connected to the first discharge hole 331. The damper 35 is rotatably coupled to a discharge end of the discharge duct 34. Also, the ice chute 21 is connected to a discharge side of the discharge duct 34 to communicate with the discharge duct 34. Thus, the ices discharged through the first discharge hole 331 are moved along the discharge duct 34. Also, the ices guided into the discharge duct 34 by opening the damper 35 are discharged to the outside of the water purifier through the ice chute 21. Also, a shutter 38 rotated at a predetermined angle in a state where the shutter 38 is closely attached to an outer surface of the ice bin 33 is disposed on the first discharge hole 331. The shutter 38 may be rotated by an opening/closing motor 381 which is forwardly or backwardly rotatable.

Also, a second discharge hole 332 through ice to be supplied into the cool water tank 36 are discharged is defined in a bottom surface of a rear side of the ice bin 33 disposed opposite to the position in which the first discharge hole 331 is defined. In detail, the second discharge hole 332 may be opened toward the cool water tank 36.

Also, the opening/closing wall 333 integrally coupled to the outer surface of the transfer shaft 371 may have a cylindrical shape. One surface of the opening/closing wall 333 having the cylindrical shape, i.e., a surface of the opening/closing wall 333 facing the auger 372 may be opened, and an opposite surface may be closed. The a through hole 333a having a predetermined size is define din the closed surface. The through hole 333a may have various shapes. For example, the through hole 333a may have a fan shape. As the transfer shaft 371 is rotated, the auger 372 and the opening/closing wall 333 may be rotated together. When the transfer shaft 371 is rotated at an angle at which the through hole 333a is disposed at the bottom side of the ice bin 33, ices pressed by the auger 372 may be discharged through the through hole 333a. Also, the ices discharged through the through hole 333a drop into the cool water tank 36 through the second discharge hole 332.

The cool water tank 36 may be a tank having a predetermined volume and a hexahedral shape. An inlet port 361 through which ices are received may protrude from a top surface of the cool water tank 36. The inlet port 361 may be disposed directly under the second discharge hole 332. Also, as shown in FIGS. 3 and 4, the inlet port 361 may have a rib shape extending from the top surface of the cool water tank 36 by a predetermined length. Also, the inlet port 361 may have a circular, non-circular, or polygonal shape in section.

The ice maker 32, the ice bin 33, and the cool water tank 36 are received in a single storage space 300 defined by the housing 31. Also, the storage space 300 may be maintained in a low temperature state, e.g., at a temperature of about 3° C. by an evaporation unit 54 (see reference numeral 54 of FIG. 5) extending from a bottom surface of the ice tray 321. The evaporation unit represents a refrigerant tube in which a low-temperature low-pressure two-phase refrigerant passing through an expansion member flows.

Also, a supply tube 41 for supplying purified water into the cool water tank 36 and a discharge tube 42 for discharging the water stored in the cool water tank 36 may pass through the bottom surface of the housing 31 to communicate with the bottom surface of the cool water tank 36.

Functions of the ice making assembly 30 having the above-described structure will be simply described.

First, to maintain water stored in the cool water tank 36 in a cool water state having a temperature less than room temperature, the ices stored in the ice bin 33 should be supplied into the cool water tank 36. For this, the transfer shaft 371 is rotated in one direction, and thus, the auger 372 is rotated together with the transfer shaft 371 to push ices toward the through hole 333a. Thus, the ices stored in the ice bin 33 are discharged through the through hole 333a and the second discharge hole. Then, the discharged ices drop into the cool water tank 36 through the inlet port 361 of the cool water tank 36.

On the other hand, when the user inputs the ice dispensing command, the transfer motor 371 is reversely rotated. Thus, the ices stored in the ice bin 33 are guided toward the first discharge hole 331 by the auger 372. Also, the ices guided into the first discharge hole 331 are discharged into the dispenser 20 through the discharge duct and the ice chute 21. Here, when the ice dispensing command is not inputted, the first discharge hole 331 is closed by the shutter 38, and a discharge hole of the discharge duct 34 is closed by the damper 35. Thus, it may completely prevent external air from being introduced into the housing 31.

Figure 5:
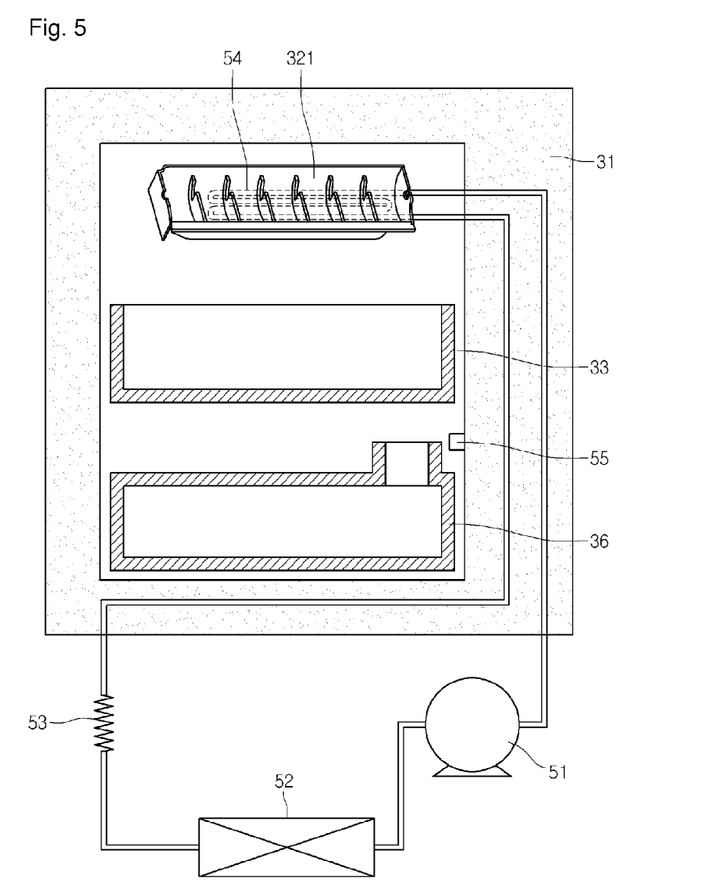
FIG. 5 is a schematic cross-sectional view illustrating the inner structure of the ice making assembly according to an embodiment.
Figure 6:
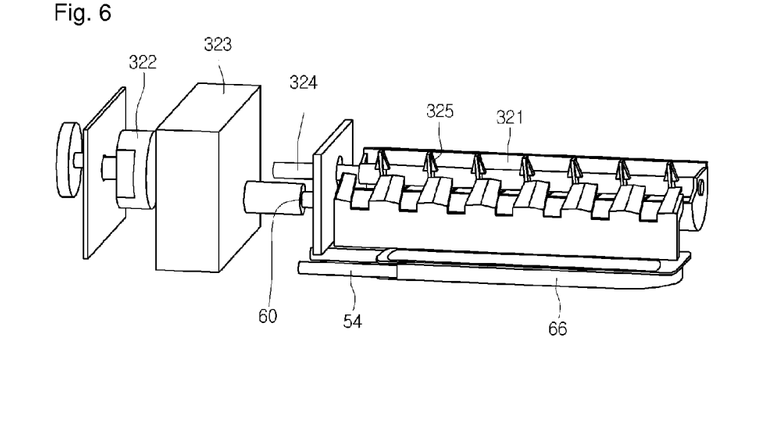
FIG. 6 is a perspective view of an ice maker according to an embodiment.

FIG. 5 is a schematic cross-sectional view illustrating the inner structure of the ice making assembly according to an embodiment. FIG. 6 is a perspective view of an ice maker according to an embodiment.

Referring to FIGS. 5 and 6, the refrigerating cycle is installed to freeze water supplied into the ice tray 321. In detail, the refrigerating cycle includes a compression unit 51 for compressing a refrigerant, a condensation unit 52 for condensing the refrigerant compressed by the compression unit 51, an expansion unit 53 for expanding the refrigerant passing through the condensation unit 52 into a low-temperature low-pressure two-phase refrigerant state, and an evaporation unit 54 for heat-exchanging the refrigerant passing through the expansion unit 53 with cool air within the housing 31.

The evaporation unit 54 may be a portion of the refrigerant tube connecting the refrigerating cycle to each other to form a close loop shape. The evaporation unit 54 may be bent at least one time on the bottom surface of the ice tray 321. The inside of the ice tray 321 may be partitioned into a plurality of ice making spaces by a plurality of partition walls. Also, the ice separation shaft 324 extends in a length direction of the ice tray 321 above the ice tray 321. Also, a plurality of ejectors 325 protrude from an outer surface of the ice separation shaft 324. The ejectors 325 are disposed in the ice making spaces defined by the ice tray 321, respectively. Thus, as the ice separation shaft 324 is rotated, the ejectors may be rotated together to draw up ices made in the ice tray 321.

Also, a tray temperature sensor 60 is disposed on the outer surface of the ice tray 321 to detect a surface temperature of the ice tray 321. Also, an ice making completion time point may be determined according to the surface temperature of the ice tray 321.

Also, the ice separation motor assembly 333 is connected to an end of the ice separation shaft 324. According to products, a gear box 323 may be disposed between the ice separation motor assembly 322 and the ice separation shaft 324. That is, a rotation force generated by the ice separation motor assembly 322 may be indirectly transmitted into the ice separation shaft 324 through the gear box 323. The gear box 323 may be a deceleration gear assembly for reducing the rotation number of the ice separation motor assembly 322.

The ice tray 321, the ice bin 33 disposed under the ice tray 321, and the cool water tank 36 disposed under the ice bin 33 are received in the storage space 300 defined by the housing 31. Also, a refrigerator temperature sensor 55 may be disposed on a side of an inner surface of the housing 31 to detect an internal temperature of the storage space 300.

Also, the storage space 300 may be maintained at a predetermined temperature, e.g., a temperature of about 3° C. This may be possible by heat-exchanging the evaporation unit 54 mounted on the bottom surface of the ice tray 321 with air within the storage space 300. In detail, a direct ice making method in which ices are made by heat-exchanging the evaporation unit 54 with water supplied into the ice tray 321, but not an indirect ice making method in which the water supplied into the ice tray 321 is converted into ices by cool air within the storage space 300 may be adopted. Also, the temperature of the storage space 300 may be maintained through a direct cooling method in which the evaporation unit is directly heat-exchanged with air within the storage space 300, but not an indirect cooling method in which cool air is supplied into the storage space 300 to cool the storage space 300.

In case of a general ice making water purifier, when an ice making process is finished in the ice maker 32, an operation of the refrigerating cycle is stopped. However, in the current embodiment, although an ice making process is finished in the ice maker 32, the operation of the refrigerating cycle may be continuously performed in a case where the temperature of the storage space 300 is greater than a set temperature. That is to say, to decrease the temperature of the storage space 300 to the set temperature or less, the ice tray 321 may be continuously cooled in a state where the ice tray 321 is empty. Thus, the evaporation unit 54 and the air within the storage space may be heat-exchanged, and also, the ice tray 321 and the air within the storage space may be heat-exchanged. Also, when the temperature of the storage space 300 is decreased to the set temperature or less, the operation of the refrigerating cycle may be stopped.

According to the above-described operation method, moisture contained in the air within the storage space 300 may be condensed while the storage space 300 is cooled. Thus, a surface of the ice tray 321 and a surface of the evaporation unit 54 may be frozen. Also, as a time elapses, an ice accumulated on the ice tray 321 and the evaporation unit 54 may be thicker. As a result, the heat-exchange between the evaporation unit 54 and the air within the storage space 300 and between the ice tray and the air may not be smoothly performed.

To prevent the heat exchange performance from being deteriorated by the ice attached to the surfaces of the ice tray 321 and the evaporation unit 54, a control method according to an embodiment is proposed. Hereinafter, the control method will be described in detail with reference to the flow-chart of FIG. 7.

Figure 7:
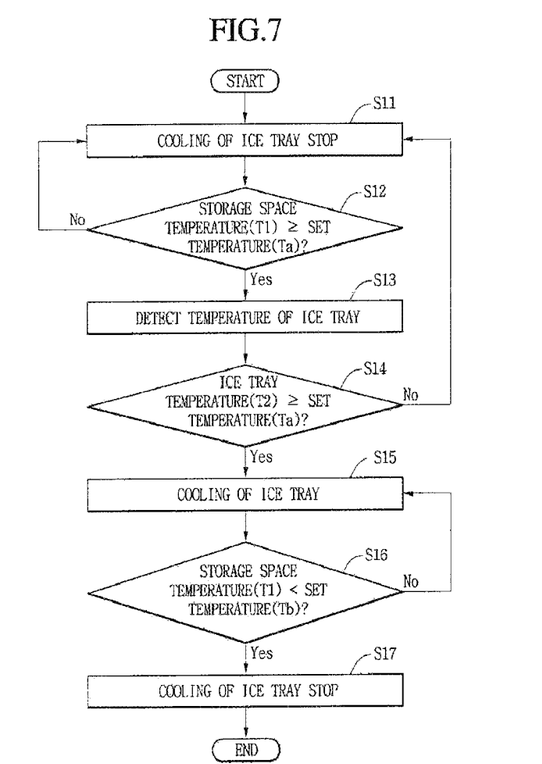
FIG. 7 is a flowchart illustrating a process for controlling a refrigerating device according to an embodiment.

FIG. 7 is a flowchart illustrating a process for controlling a refrigerating device according to an embodiment.

Hereinafter, the direct cooling method in which the evaporation unit 54, the ice tray 321 mounted on the evaporation unit 54, and the air within the storage space directly contact each other to perform the heat exchange therebetween may be described as the control method for the cooling device.

To present the heat exchange performance from being deteriorated by the above-described freezing, the following control method may be applied.

First, since ice making process is completed, and a storage space 300 is maintained to a set temperature, a control process starts in a state where cooling of the ice tray 321 is stopped (S11), i.e., an operation of a refrigerating cycle is stopped.

A refrigerator temperature sensor 55 installed in the storage space 300 detects a temperature of a refrigerator in real-time or periodically to determine whether a storage space temperature T1 is greater than a set temperature Ta (S12). In the strict sense, a control unit may determine whether a temperature of the storage space is greater than a set temperature. If the storage space temperature T1 is less than the set temperature Ta, the refrigerating cycle is maintained in a stopped state. On the other hand, if it is determined that the storage space temperature T1 is greater than the set temperature Ta, a tray temperature sensor 60 mounted on the ice tray 321 detects a temperature of the ice tray 321 (S13). When it is determined that the ice tray temperature T2 is greater than the set temperature Ta, the ice tray 321 is cooled. That is, a refrigerating cycle is operated to supply low-temperature cool air into an evaporation unit 54.

On the other hand, when it is determined that the temperature of the ice tray 321 is less than the set temperature Ta, the refrigerating cycle is maintained as ever in the stopped state. That is to say, even though the temperature of the storage space 300 is greater than the set temperature Ta, when the temperature of the ice tray 321 is less than the set temperature Ta, the refrigerating cycle is not operated. The reason is as follows.

Although it is need to perform a cooling operation because the temperature of the storage space 300 is greater than the set temperature Ta, if an ice attached to the ice tray 321 is not melted and thus separated, cooling efficiency may be deteriorated to increase power consumption. Thus, the refrigerating cycle is operated after a wait until a surface temperature of the ice tray 321 is greater than the set temperature Ta. Here, the control unit may be programmed so that the operation of the refrigerating cycle is delayed until the surface temperature of the evaporation unit 54 as well as the ice tray 321 is greater than the set temperature Ta. Here, the set temperature Ta may represent a temperature enough to melt and separate the ice attached to the surface of the ice tray 321, for example, a temperature of about 3° C. to about 4° C.

When it is determined that the ice tray temperature T2 is greater than the set temperature Ta, the refrigerating cycle is operated to cool the ice tray 321 (S15). Also, it is determined whether the storage space temperature T1 is less than a set temperature Tb (S16). When this condition is satisfied, the operation of the refrigerating cycle is stopped to stop the cooling of the ice tray 321 (S17).

According to the above-described control method, to improve the cooling efficiency of the storage space, since the refrigerating cycle is operated after the ice attached to the surface of the ice tray 321 and/or the evaporation unit 54 is removed, the time taken for cooling the storage space 300 to the set temperature may be reduced.

Figure 8:
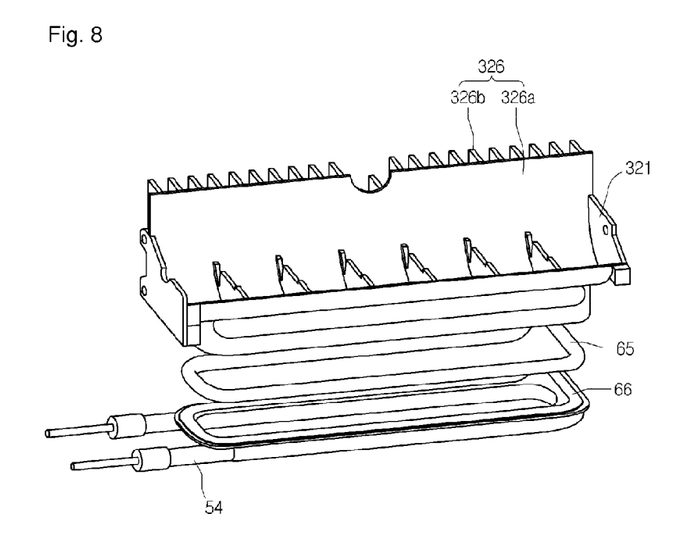
FIG. 8 is an exploded perspective view illustrating a structure of an ice maker for improving cooling efficiency according to another embodiment.

FIG. 8 is an exploded perspective view illustrating a structure of an ice maker for improving cooling efficiency according to another embodiment.

Referring to FIG. 8, a structure of the ice tray 321 may be improved to improve the heat exchange efficiency in an ice storage apparatus to which the direct cooling method is applied.

In detail, an ice maker may include an ice tray 321, an ice separation heater 65 mounted on a bottom surface of the ice tray 321, an evaporation unit 54 mounted under the ice separation heater 65. Also, the evaporation unit 54 may be fixed by a separate bracket 66. The ice separation heater 65 may be mounted between a top surface of the bracket 66 and the bottom surface of the ice tray 321. When the bracket 66 is coupled to the bottom surface of the ice tray 321, the ice separation heater 65 is seated on the top surface of the bracket 66, and the evaporation unit 54 is fixed to the bottom surface of the bracket 66. The bracket 66 may be formed of a metal member having superior thermal conductivity to quickly transfer cool air from the evaporation unit 54 toward the ice tray 321.

A heat transfer unit 326 for heat-exchanging may be disposed on a side of the ice tray 321. For example, as shown in FIG. 8, the heat transfer unit 326 may be disposed on a rear surface of the ice tray 321, i.e., a surface of the ice tray 321 fixed to an inner surface of the housing 31.

The heat transfer unit 326 may include a heat transfer plate 326a extending upward from an upper end of the rear surface of the ice tray 321 by a predetermined length and a plurality of heat transfer fins protruding from a rear surface of the heat transfer plate 326b.

As described above, the ice tray 321 may be increased in surface area, and also, the heat transfer fins may be disposed on the extension portion of the ice tray 321. Thus, a contact area between the cool air transferred from the evaporation unit 54 toward the ice tray 321 and internal air of a storage space 300 may be increased. As the contact area is increased, a heat-exchange time may be reduced, and a heat-exchange amount may be increased.

Figure 9:
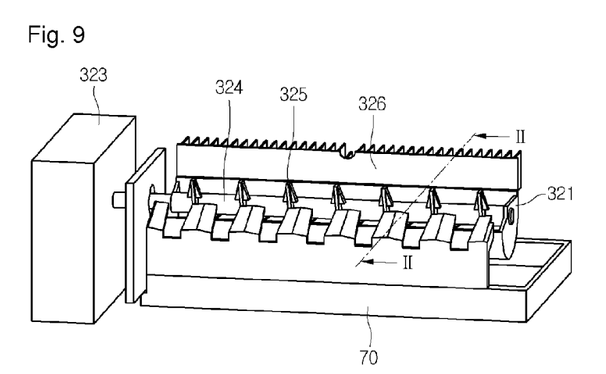
FIG. 9 is a perspective view illustrating a structure of an ice maker according to another embodiment.
Figure 10:
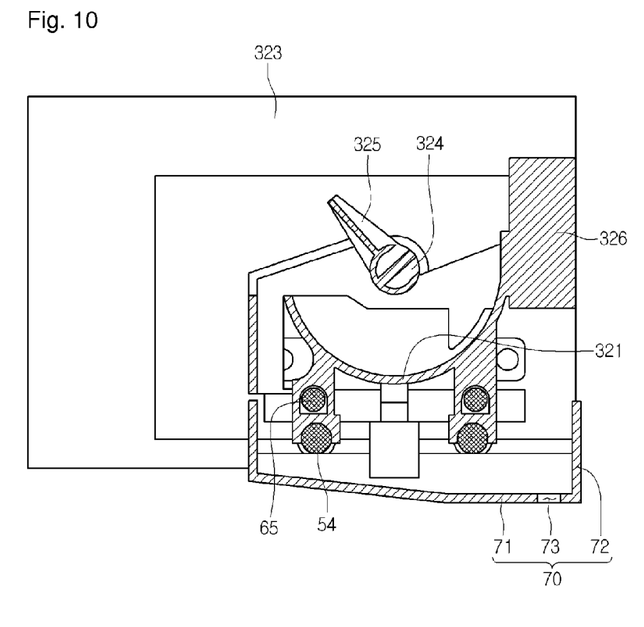
FIG. 10 is a cross-sectional view taken along line II-II of FIG. 9.

FIG. 9 is a perspective view illustrating a structure of an ice maker according to another embodiment. FIG. 10 is a cross-sectional view taken along line II-II of FIG. 9.

Referring to FIGS. 9 and 10, the current embodiment provides a defrosted water tray 70 for receiving defrosted water generated when ices attached to surfaces of an ice tray 321 and an evaporation unit 54 are melted.

According to the control algorithm as described with reference to FIG. 7, the ices attached to the surfaces of the ice tray 321 and the evaporation unit 54 may be melted to generate the defrosted water. The defrosted water may cause a phenomenon in which the defrosted water drops onto ices stored in an ice bin 33 to melt and congeal the ices. In addition, when the defrosted water is evaporated, humidity within the storage space 300 may be increased. Thus, during the cooling operation process, the defrosted water may be frozen on the ice tray 321 and the evaporation unit 54. Thus, to prevent the ice from being congealed with each other and humidity within a refrigerator from being increased, it may be necessary to install the separate defrosted water tray 70.

In detail, the defrosted water tray 70 may be mounted on the bottom surface of the ice tray 321. Also, the defrosted water tray 70 has a bottom part 71 and a wall part 72 extending upward from the bottom part 71 to provide a volume for storing the defrosted water having a predetermined amount. Also, the bottom part 71 may be inclined toward an edge of any side to smoothly drain the defrosted water. Also, a drain hole 73 may be defined in one side of the bottom part 71, i.e., the lowest portion of the inclined surface of the bottom part 71. Although not shown, a drain hose may be connected to the drain hole 73. The drain hose may extend to the outside of an ice making assembly 30.

According to the above-described structure, the defrosted water melted to drop down from the ice tray 321 and the evaporation unit 54 may be collected into the defrosted water tray 70. Also, the defrosted water collected into the defrosted water tray 70 may be discharged to the outside. Thus, the humidity within the storage space 300 may be maintained at a low level to prevent an ice from being attached to the ice tray 321 and the evaporation unit 54.

The invention claimed is:

1. A method for controlling an ice storage apparatus comprising a housing defining a storage space, an ice tray received within the housing, and an evaporation unit attached to an outer surface of the ice tray, wherein the ice tray and the evaporation unit directly contact air within the housing to cool the storage space, the method comprising:
   detecting a temperature of the storage space (T1) and determining whether the storage space temperature is greater than a set temperature (Ta);
   wherein when the storage space temperature (T1) is greater than the set temperature (Ta), detecting a temperature of the ice tray (T2) and determining whether the temperature of the ice tray (T2) is greater than the set temperature (Ta),
   when the ice tray temperature (T2) is greater than the set temperature (Ta), then cooling the ice tray to reduce the storage space temperature (T1) and cool the ice tray, and when the ice tray temperature (T2) is not greater than the set temperature (Ta), then not cooling the ice tray;
   wherein when the storage space temperature (T1) is not greater than the set temperature (Ta), then the ice tray temperature (T2) is not detected and the ice tray is not cooled.

2. The method according to claim 1, wherein the set temperature (Ta) ranges from about 3° C. to about 4° C.

3. The method according to claim 1, wherein the set temperature (Ta) is greater than about 0° C.

4. The method according to claim 1, wherein the ice tray is continuously cooled until the temperature of the storage space reaches a set temperature (Tb) even though water within the ice tray does not exist.

5. The method according to claim 1, wherein the cooling of the ice tray is performed by an operation of a refrigerating cycle comprising the evaporation unit.

6. The method according to claim 1, wherein the storage space is not cooled unless the storage space temperature (T1) and the ice tray temperature (T2) are greater than the set temperature (Ta).

* * * * *